(12) United States Patent
Suck et al.

(10) Patent No.: US 7,017,994 B2
(45) Date of Patent: Mar. 28, 2006

(54) MOTOR VEHICLE SEAT

(75) Inventors: Wolfgang Suck, Coburg (DE); Peter Rausch, Niederfüllbach (DE); Christina Schwerdiner, Neustadt (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/477,658

(22) PCT Filed: May 22, 2002

(86) PCT No.: PCT/DE02/01910

§ 371 (c)(1),
(2), (4) Date: Nov. 14, 2003

(87) PCT Pub. No.: WO02/094606

PCT Pub. Date: Nov. 28, 2002

(65) Prior Publication Data
US 2004/0135412 A1    Jul. 15, 2004

(30) Foreign Application Priority Data
May 23, 2001  (DE) .............................. 101 27 067

(51) Int. Cl.
*A47C 1/02* (2006.01)
(52) U.S. Cl. ...................... 297/341; 297/340
(58) Field of Classification Search ............... 297/341, 297/375, 378.1, 378.12, 362.14, 363, 361.1, 297/362.12, 340; 248/429, 430, 421; 296/65.17, 296/65.18, 65.16, 65.09; 74/533, 534, 535, 74/536, 537
See application file for complete search history.

(56) References Cited

U.S. PATENT DOCUMENTS 4,844,542 A * 7/1989 Humer ........................ 297/341
5,531,503 A * 7/1996 Hughes ...................... 297/341

(Continued)

FOREIGN PATENT DOCUMENTS

DE          544 463           2/1932

(Continued)

OTHER PUBLICATIONS

Internatioanl Search Report of PCT/DE02/01910, dated Sep. 16, 2002.

(Continued)

*Primary Examiner*—Peter M. Cuomo
*Assistant Examiner*—Erika Garrett
(74) *Attorney, Agent, or Firm*—Christie, Parker and Hale, LLP

(57) ABSTRACT

A motor vehicle seat having a seat frame; a pivotally mounted seat back of the seat frame that, on the one hand, can be displaced within an area of use between two different positions of use and, on the other hand, can be tilted forward toward the seat surface of the seat frame by being pivoted; a seat longitudinal guide for adjusting the longitudinal position of the seat; a fixing device for locking a previously adjusted longitudinal position of the seat, and; a coupling mechanism via which the back seat back is coupled to the fixing device whereby enabling the fixing device to be released when tilting the seat back forward toward the seat surface. Compensating features are provided for preventing the fixing device from releasing when the seat back pivots at least over a portion of the area of use.

17 Claims, 15 Drawing Sheets

U.S. PATENT DOCUMENTS

| | | | |
|---|---|---|---|
| 5,597,206 A * | 1/1997 | Ainsworth et al. | 297/378.12 |
| 5,899,532 A * | 5/1999 | Paisley et al. | 297/341 |
| 5,918,939 A * | 7/1999 | Magadanz | 297/378.12 |
| 5,944,383 A * | 8/1999 | Mathey et al. | 297/341 |
| 6,017,090 A * | 1/2000 | Bonk | 297/362.12 |
| 6,102,478 A * | 8/2000 | Christopher | 297/341 |
| 6,152,533 A * | 11/2000 | Smuk | 297/341 |
| 6,231,123 B1 * | 5/2001 | Tame | 297/378.1 |
| 6,254,188 B1 * | 7/2001 | Downey | 297/341 |
| 6,631,952 B1 | 10/2003 | Liebetrau et al. | |

FOREIGN PATENT DOCUMENTS

| | | |
|---|---|---|
| DE | 30 36 559 A1 | 4/1982 |
| DE | 34 26 265 C2 | 1/1986 |
| DE | 36 08 827 A1 | 10/1987 |
| DE | 42 01 829 A1 | 6/1993 |
| DE | 695 03 701 T2 | 11/1995 |
| DE | 44 23 634 C2 | 1/1996 |
| DE | 196 33 780 C2 | 2/1998 |
| DE | 299 10 720 U1 | 9/1999 |
| EP | 0 683 066 A1 | 11/1995 |
| EP | 0 800 952 A1 | 10/1997 |
| EP | 0 878 344 A2 | 10/1998 |
| FR | 2 391 873 | 12/1978 |
| FR | 2 691 681 A1 | 12/1993 |
| FR | 2 800 021 A1 | 4/2001 |
| WO | WO 98/25785 | 6/1998 |
| WO | WO 00/55002 | 9/2000 |

OTHER PUBLICATIONS

Internatioanl Preliminary Examination Report of PCT/DE02/01910, dated Jul. 9, 2003.

International Search Report of PCT/DE01/04274, dated May 10, 2002.

English International Preliminary Examination Report of PCT/DE01/04274, dated Mar. 5, 2003.

* cited by examiner

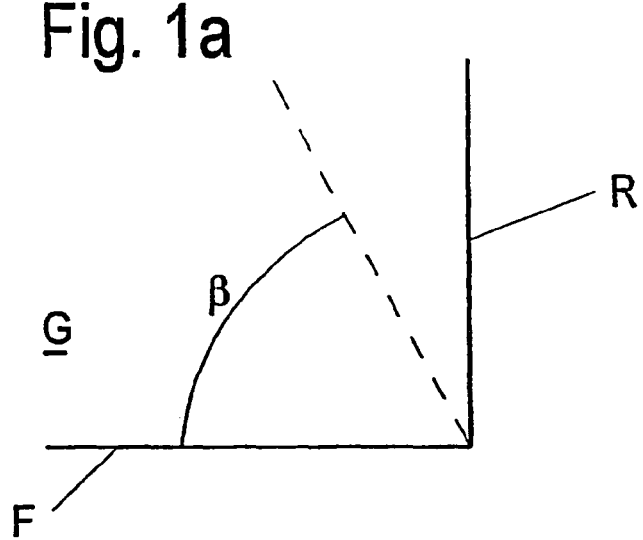
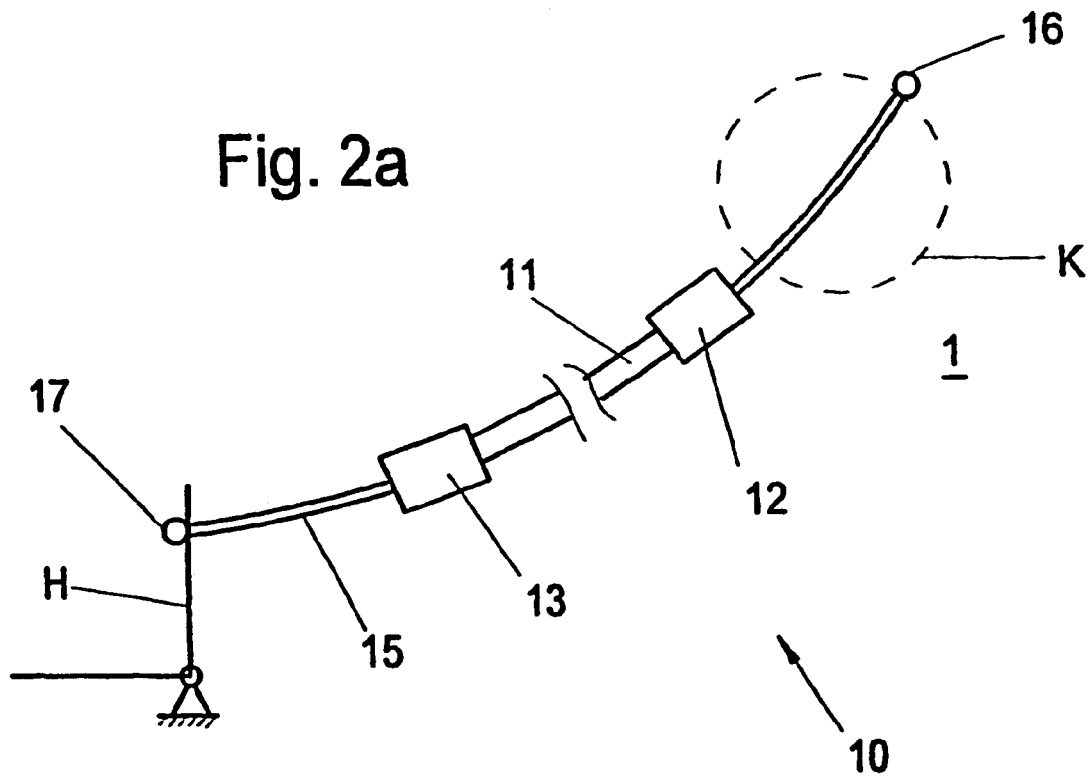

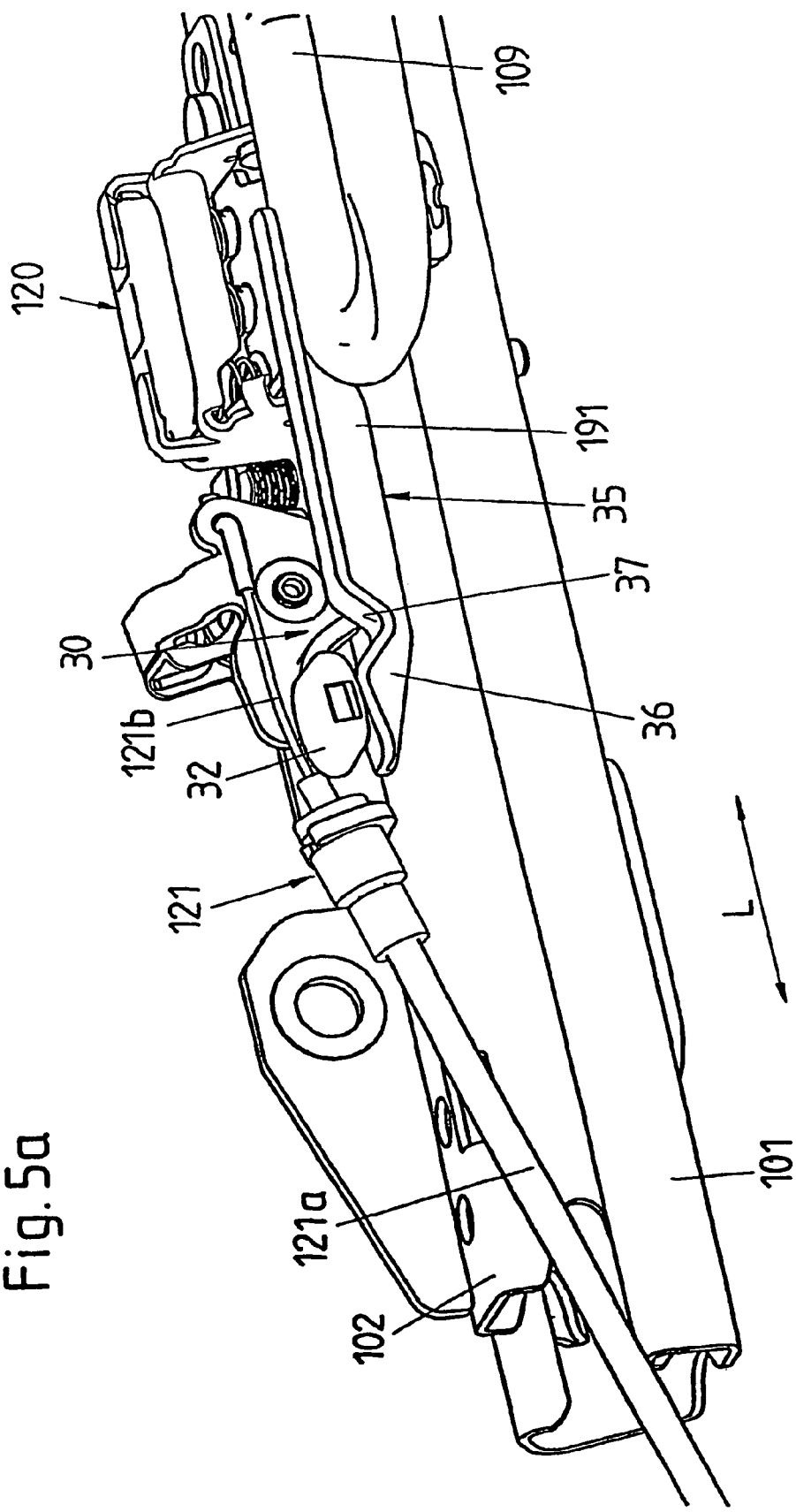

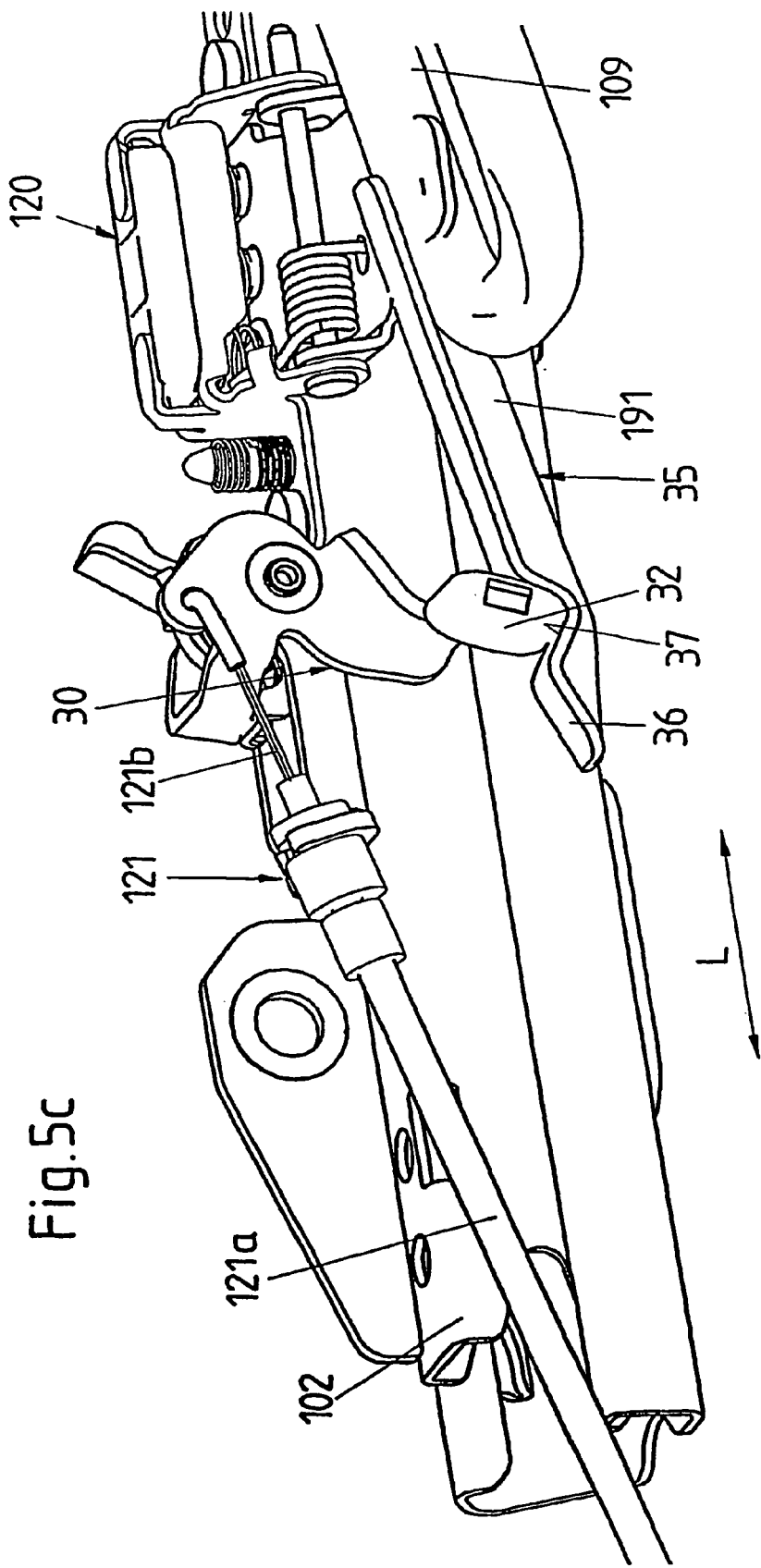

MOTOR VEHICLE SEAT

CROSS-REFERENCE TO RELATED APPLICATION

This application is a National Phase Patent Application of International Application Number PCT/DE02/01910, filed on May 22, 2002, which claims priority of German Patent Application Number 101 27 067.4, filed on May 23, 2001.

BACKGROUND

The invention relates to a motor vehicle seat.

A motor vehicle seat of this kind comprises a seat frame; a pivotally mounted back rest of the seat frame which can be adjusted on one side (by pivoting) in an area of use between different useful positions and which on the other side—after releasing the backrest, for example by means of a release lever normally provided for this on the backrest—can be folded forwards (by pivoting) steplessly towards the seat surface of the seat frame; a seat longitudinal guide for adjusting the seat longitudinal position of the seat frame; a fixing device for locking a previously set longitudinal position; a coupling mechanism through which the backrest is coupled to the fixing device so that when the backrest is folded forwards towards the seat surface the fixing device can be released by an output side of the coupling mechanism; as well as a tumbler fitment of the backrest which when pivoting the backrest tumbles about a tumbler axis and to which an input side of the coupling mechanism is connected.

The different useful positions which the seat back can occupy in the area of use serve to support the back of a person seated on the seat. Further useful positions can also serve to support the back of a person reclining on the seat.

Folding the backrest onto the seat surface, on the other hand, serves to release the fixing device of the seat longitudinal guide through the coupling mechanism which is connected on the input side to the tumbler fitment and on the output side to the fixing device. Folding the backrest forwards is normally accomplished by actuating a lever provided for this purpose on the backrest which enables the backrest to be folded effortlessly forwards onto the seat surface whilst at the same time releasing the useful position of the vehicle seat which previously existed.

After releasing the fixing device by folding the backrest forwards the seat can be easily moved forwards, for example, to facilitate ease of entry into the back of the vehicle in the case of a two-door cabriolet vehicle. This is the so-called easy-entry function which is to make access to the back seat of a two-door vehicle that much easier. This easy-entry function is often coupled to a memory device through which the original seat position is automatically relocated when subsequently sliding back the vehicle seat.

In the case of a known vehicle seat of the type mentioned at the beginning, the coupling mechanism comprises a Bowden cable whose core is connected on one side to the tumbler fitment and on the other side (if necessary through further coupling elements) to the fixing device of the seat longitudinal guide. The problem here is that as a result of the tumbler movement of the tumbler fitment when swiveling the seat—depending upon the useful position in which the seat is already located—there is a different lengthening of the Bowden cable and thus different operating paths arise for releasing the fixing device by means of the Bowden cable. In order to solve this problem it is known to integrate an elastic element in the form of a tensile spring into the core of the Bowden cable whereby the spring constant of this spring is so great that it does not impair the actuation of the fixing device by means of the Bowden cable. The action of this spring must thus overcome the action of the spring elements normally integrated into the fixing device whose function is to pretension the fixing device into its locked state. (Through this pretensioning of the fixing device into its locked state it is to be guaranteed for safety reasons that the seat longitudinal guide is always then automatically locked unless an occupant actively actuates the release of the fixing device). Only if the fixing device is fully unlocked and further actuation of the fixing device by means of the coupling mechanism is no longer possible does the tensile spring expand and thus permit compensation of the overtravel which can happen as a result of the previously mentioned different actuating paths for releasing the fixing device—depending on the position of the seat back and thus the tumbler fitment at the start of folding the backrest forwards.

The known coupling mechanism for the easy-entry function has the drawback that as a result of the large spring constant required the spring which is to be integrated for this into the Bowden cable takes up some structural space and significantly increases the weight of the assembly.

SUMMARY

The object of the invention is to improve a motor vehicle seat of the type already mentioned so that with simple means it is possible to couple the backrest through the tumbler fitment and a coupling mechanism to the fixing device of the seat longitudinal guide.

According to this, compensating means are provided which when pivoting the back rest (for the purpose of adjusting the useful position of the backrest or for folding the backrest forwards) prevent a release of the fixing device at least over a partial area of the area of use.

With the solution according to the invention—unlike the prior art—not simply is the overtravel compensated which can occur after releasing the fixing device, but rather compensation of the tolerances which are due to the tumbler motion of the tumbler fitment already takes place before the release of the fixing device. For this, compensating means are provided which prevent the release from already taking place whilst the backrest during folding forwards is still located in its area of use or at least in a certain predeterminable portion of this area of use.

The portion of the area of use can, on the one hand, be smaller than the latter; these two areas can however also coincide so that release of the fixing device is impossible so long as the seat back is still located in its area of use when folding forwards.

The compensating means can be formed in particular for compensating the action of the backrest on the coupling mechanism when pivoting the backrest in the said portion of the area of use. In other words, the compensating means compensate the action of the backrest (through the tumbler fitment) on the coupling mechanism so that no such action of the coupling mechanism on the fixing device can take place which would lead to a release of the fixing device.

In a further embodiment, the compensating means are formed and provided to prevent, during pivoting of the backrest, at least in the portion of the compensating area, any action of the coupling mechanism on the fixing device.

In a preferred embodiment the compensating means are formed and provided to only permit an action of the coupling mechanism on the fixing device when the backrest when folding forwards for the purpose of releasing the easy-entry function has reached the fully folded forwards position (corresponding to the backrest resting on the seat surface) except for a predetermined angular difference. In this case it is ensured that irrespective of the useful position in which the vehicle seat is located during release of the easy-entry function, the action of the coupling mechanism on the fixing device always starts at the same forward rake angle of the backrest.

According to a variation of the invention the compensating means are mounted in or on the coupling mechanism. It can hereby be proposed that the compensating means during pivoting of the backrest at least in the portion of the compensation area compensate an action of the backrest or tumbler fitment on the coupling mechanism so that the coupling mechanism on the output side does not act on the fixing device.

The solution according to the invention can be applied in particular to a coupling mechanism having traction means, which during pivoting of the backrest and the tumbler movement of the fitment involved therewith, transfers forces to the output side of the coupling mechanism so that the coupling mechanism can act on the fixing device. The core of a Bowden cable is thereby particularly suitable as traction means.

According to an embodiment of the invention the traction means are dimensioned so that they are slack when the backrest is swiveled in the area of use or at least a portion of same. No forces can then be transferred through the traction means so long as the backrest when folding forwards is still located in the area of use or the said portion of the area of use. Thus, so long as the backrest when folding forwards for the purpose of releasing the easy-entry function is still in the said swivel range (area of use or a portion thereof), the corresponding movement only leads to a breakdown of the cable slack, thus not however to a release of the fixing device. This only starts when the cable slack has completely broken down and, thus, only at a defined swivel position of the backrest behind the area of use or a portion hereof.

With a further development of the invention an elastic element additionally acts on the coupling mechanism in order to hold the traction means during swiveling of the backrest in the area of use or a portion thereof under a slight pretension which is sufficient to prevent the coupling mechanism from rattling. A very small cost-effective lightweight spring is adequate for this since it can be considerably weaker than the spring elements used to pretension the fixing device. The spring can, on the one hand, act on the traction means directly, or on the other hand, act through at least one further component on the traction means.

According to a further embodiment of the invention the traction means are fixed on a holder which is mounted to pivot about an axis, more particularly the tumbler axis, whereby this holder is then not entrained by the tumbler fitment when the backrest during folding forwards for the purpose of releasing the easy-entry function is located in its area of use or at least a portion thereof. Then during pivoting of the backrest in the area of use, or at least a portion thereof, no action takes place on the traction means through the tumbler fitment. This only happens after the backrest has been pivoted (folded forwards) beyond its area of use towards the seat surface.

In a further development of this embodiment of the invention when using a Bowden cable as the component of the coupling mechanism for fixing the sleeve of the Bowden cable on the tumbler fitment side, on the one hand, and the core on the other, two relatively rotatable holders are provided which can pivot about an axis (more particularly the tumbler axis) and which when folding the backrest forwards are only then turned relative to each other when the backrest is located outside of the area of use or at least a predetermined portion thereof. Only then by turning, the core of the Bowden cable on the one holder, and the sleeve on the other opposite holder, does the core become taut which leads to action of the fixing device.

It can hereby be further proposed that when folding the backrest forwards outside of the area of use or at least a portion thereof the one holder is moved in unison with the tumbler fitment and the other holder is blocked on a structural group of the seat frame which cannot pivot together with the backrest.

In a further embodiment of the invention, the coupling mechanism comprises a coupling lever (or release lever) which when the backrest pivots in its area of use or at least in a portion thereof does not act on the element of the coupling mechanism mounted on the output side towards the fixing device, so that the forces which are introduced on the input side into the coupling mechanism when the backrest is pivoted are not transferred towards the fixing device and thus no locking of the fixing device can take place. The release of the fixing device thus only takes place when the backrest has been folded forwards beyond its area of use or at least a defined portion thereof.

In a further development, the element of the coupling mechanism on the output side of the lever has an outward bulge in which one end of the coupling lever can move when the backrest is pivoted without acting on the element on the output side. The end of the coupling lever moves into the bulge when the release of the fixing device has concluded and thus serves for compensating the overtravel.

For compensating the overtravel generally, compensating means are provided which when folding the backrest forwards beyond the position in which the release of the fixing device has concluded, counteract any interaction of two elements of the coupling mechanism so that an additional action of the coupling mechanism on the fixing device is avoided. It should thus be prevented that when folding the backrest forward beyond the position at which the fixing device is fully released, there results a further additional action on the actuating element of the fixing device (to be deflected for unlocking the fixing device). I.e. it is prevented that the actuating element after complete release of the fixing device is deflected still further (additionally). Damage to the fixing device, for example by its resetting springs through overstraining as a result of folding the backrest forwards is hereby to be prevented.

The compensating means can be formed by an outward bulge in one of the elements of the coupling mechanism, e.g. by the second element of the coupling mechanism on the output side having a bulge in which a section of the element connected on the input side can move without acting on the element on the output side. For this the contour of the bulge has at least in part a curvature, more particularly a radius, such that a section of the element on the input side, more particularly in the form of a coupling or release lever, can move therein without acting on the element on the output side, whereby the section of the coupling lever then moves into the bulge when the release of the fixing device is completed.

In another variation of the invention the compensating means are not integrated in the coupling mechanism but rather in the fixing device of the seat longitudinal guide. For this for example the locking teeth which are normally provided in a fixing device are over long so that when the coupling mechanism acts on the fixing device the first part of the movement of the locking teeth only serves for compensating tolerances as a result of different positions of the tumbler fitment and the release effects, i.e. the lifting of the locking teeth from the associated ratchet openings of the seat longitudinal guide only then follow on.

BRIEF DESCRIPTION OF THE DRAWINGS

Further features and advantages of the invention will now be explained with reference to an embodiment illustrated in the drawings.

FIGS. 1a and 1b are diagrammatic illustrations of the seat frame of a motor vehicle seat with a backrest in two different settings of the backrest rake;

FIGS. 2a and 2b are diagrammatic views of a coupling mechanism through which the backrest of FIGS. 1a and 1b is coupled to the fixing device of a seat longitudinal guide, each in a situation which is produced through the rake of the backrest according to FIGS. 1a and 1b;

FIGS. 5a to 5c are detailed perspective illustrations of an exemplary assembly according to FIG. 4a with three different settings of the backrest rake;

DETAILED DESCRIPTION OF THE INVENTION

Figure 11:
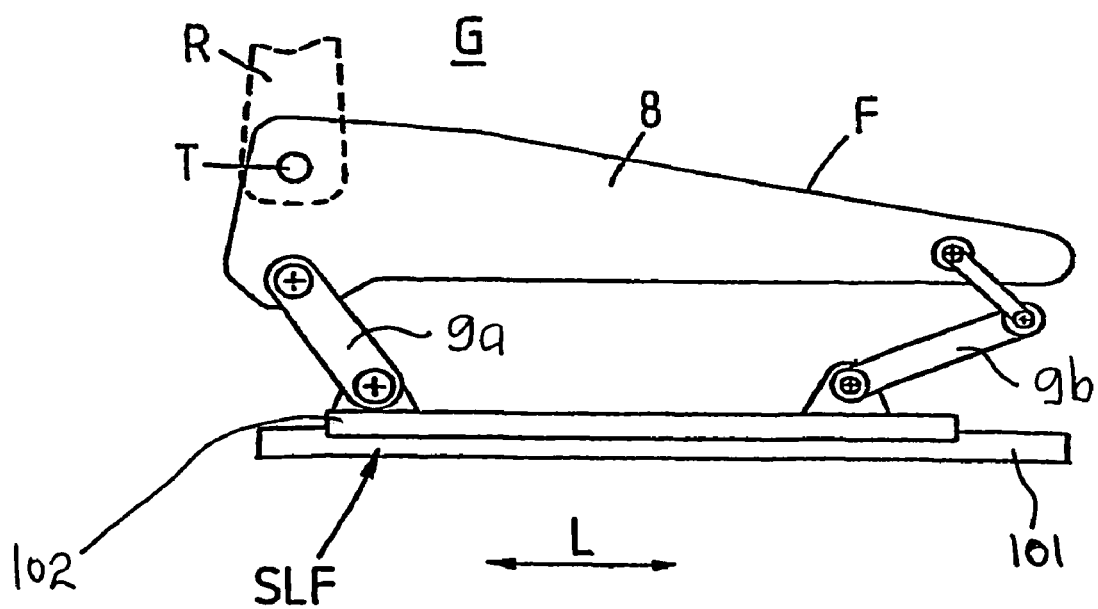
FIG. 11 is a side view of a frame of a motor vehicle seat.

The seat frame G (seat lower frame) illustrated in side view in FIG. 11 comprises a seat longitudinal guide SLF with a seat rail which is mounted movable in the seat longitudinal direction L on an under rail to be fixed on the vehicle body, and a seat side part 8 which is attached vertically adjustable on the seat rail through front and rear articulated levers 9a and 9b. On its other longitudinal side, which cannot be seen in FIG. 11, the seat frame G has a corresponding arrangement. Between the two seat side parts of the seat frame G extends a seat surface F which holds a seat cushion on which a vehicle occupant can sit.

Furthermore the side parts 8 of the seat frame G each have a tumbler fitment T for supporting a pivotal backrest R which is shown in dotted lines in FIG. 11.

Here, parts of the seat frame are to mean all those components which are movable in the seat longitudinal direction on the lower rail which is fixed on the body, thus in particular the seat rail, the seat side part 8 and the further components of the seat connected thereto.

If a vehicle seat of this kind which is adjustable in the longitudinal direction L is used for a two-door vehicle then it is known in order to make it easier to enter the back of the vehicle to couple the backrest to the seat longitudinal adjuster, namely so that when folding the backrest R forwards towards the seat surface F which extends between the seat side parts 8, a fixing device associated with the seat longitudinal guide SLF is released and the seat can be pushed forwards with the backrest folded forwards. This is the so-called easy-entry function.

In the following discussion, the basic principle of the easy entry function when using a programmable memory device for automatically seeking a predeterminable seat longitudinal position will first be explained with reference to a seat arrangement illustrated in FIGS. 6 to 10 and known from WO 00/55002 (see corresponding U.S. Pat. No. 6,631,952). For further details on this reference is made to WO 00/55002 which expressly relates to the subject of the present description.

Figure 6:
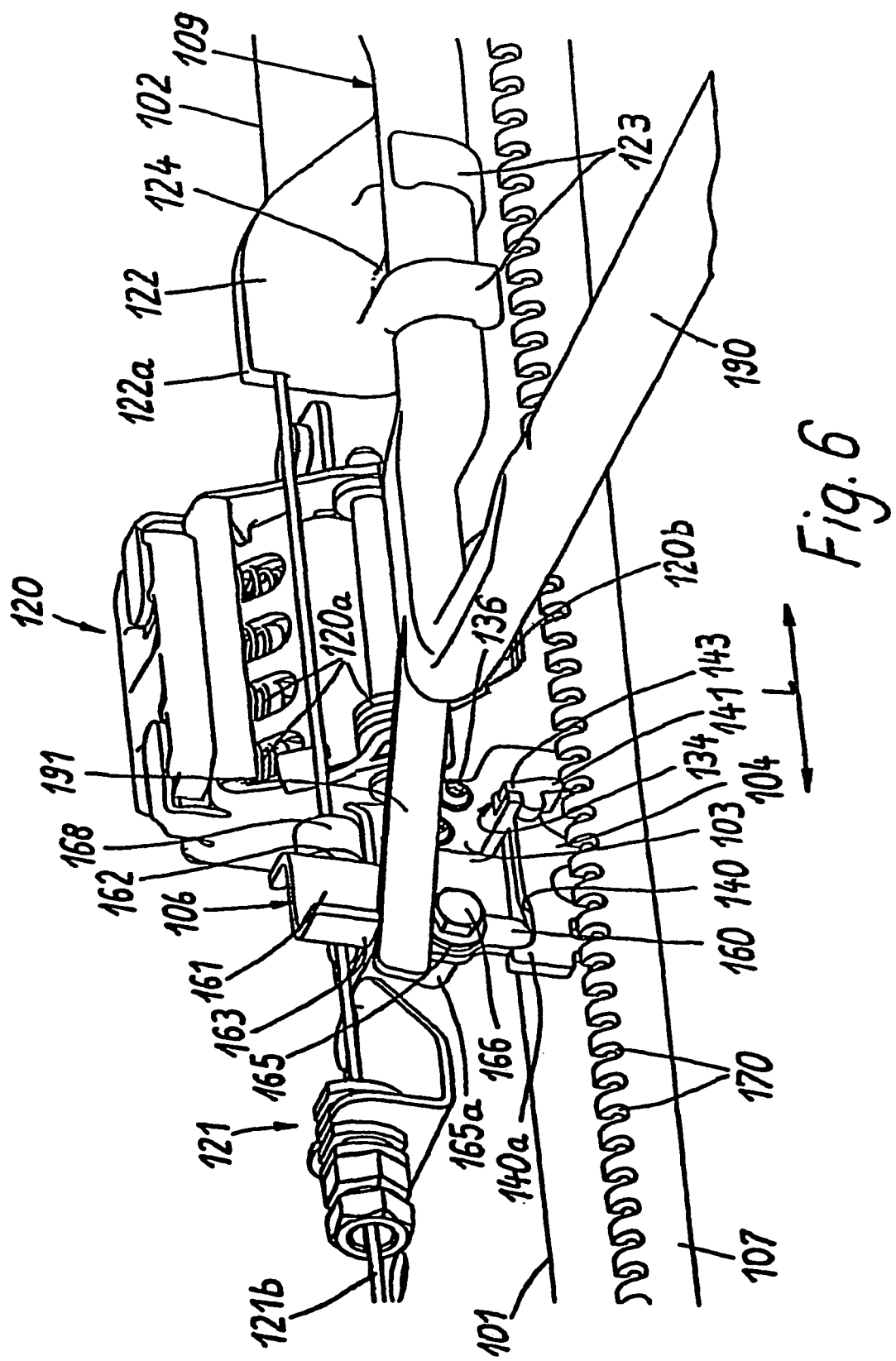
FIG. 6 is a perspective view of a part of a seat frame known from the prior art with a seat longitudinal guide, a fixing device of the seat longitudinal guide, a seat side part on which a backrest is swivel mounted as well as with a programmable memory device for automatically finding a predetermined seat longitudinal position.
Figure 6A:
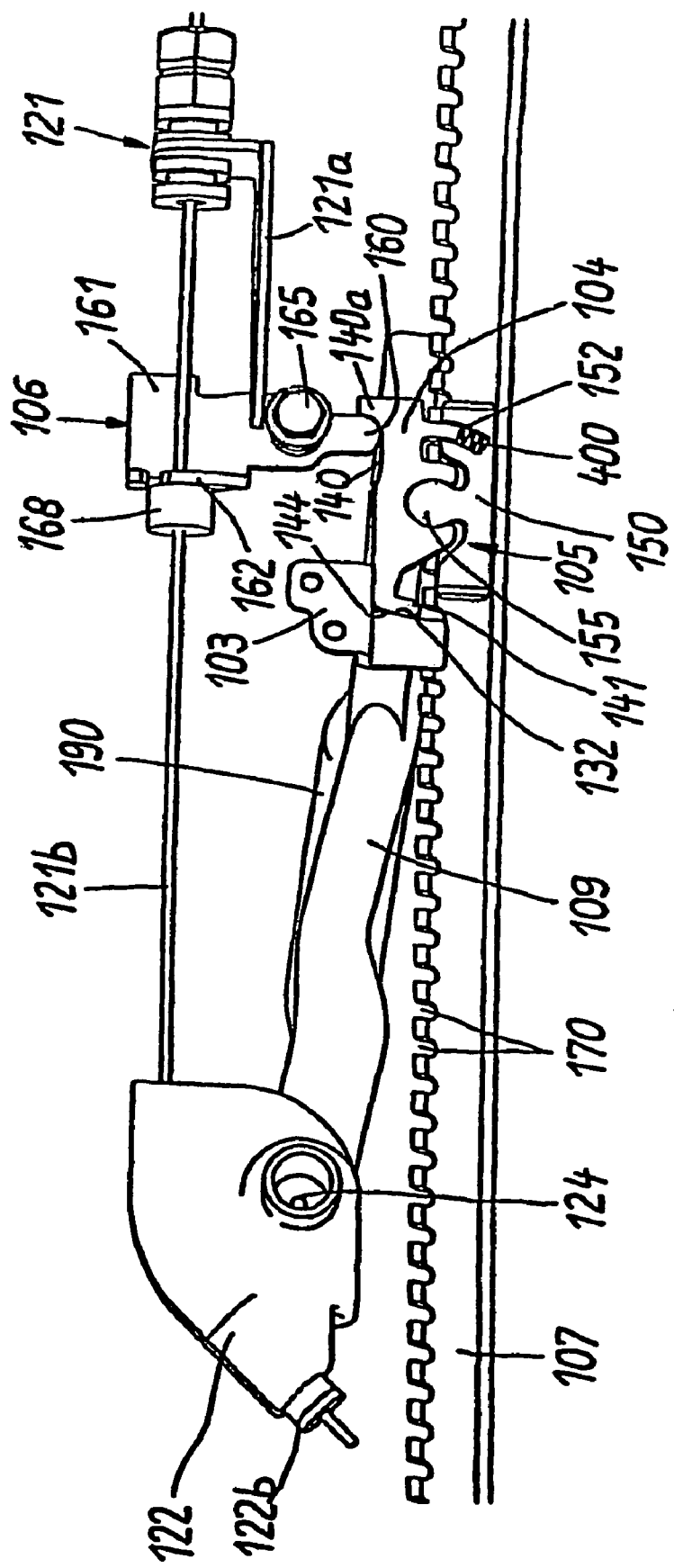
FIG. 6a is a rear view of the illustration of FIG. 6.

The perspective front view according to FIG. 6 and the associated rear view in FIG. 6a show a rail 101 fixed on the body and a seat rail 102 movably guided thereon in the seat longitudinal direction L whereby a ratchet rail 107 having several ratchet openings 170 arranged in succession in the longitudinal direction L of the seat is fixed on the rail 101 which is fixed on the body. The seat rail 102 supports the remaining components of the seat frame, see FIG. 11.

The seat rail 102 is lockable by means of a fixing device 120 in respect of the rail 101 fixed on the body. The fixing device can be any conventional fixing device used for longitudinally adjusting the seat. FIGS. 6 and 6a show the housing, a swivel mounted actuating element 120b and a torsion spring assembly (shown in FIG. 7) of a known fixing device 120 acting on the actuating element 120b, with its housing fixed on the seat rail 102. The torsion spring serves inter alia to remove the play from the assembly so as to prevent any rattling noises.

This fixing device comprises for example according to DE 299 10 720 U1 a number of locking teeth arranged inside the housing and elastically pretensioned—by means of springs mounted in the form of coil springs in the housing—towards a ratchet device (not shown in FIGS. 6 and 6a) fixed on the body-side rail 101. As a result of the pretension acting on the locking teeth the locking teeth which are associated with the seat rail 102 automatically engage in the ratchet device fixed on the body so that the seat longitudinal adjustment is locked unless the locking teeth are brought out of engagement with the ratchet device by means of the actuating element 120b provided for this purpose (see FIG. 7).

Since the actuating element 120b (FIG. 7) of the fixing device 120 is pretensioned by means of the spring assembly 120a which consists of the springs mounted inside the housing and acting on the locking teeth, as well as the torsion spring mounted outside of the housing, opposite the direction into which it has to pivot in order to release the fixing device 120, the fixing device 120 can only then be released when a force is exerted on the actuating element 120b against the action of the spring assembly 120a.

In order to release the fixing device 120 the actuating element 120b can be actuated on one side by a seat user directly by seizing an actuating lever 109 swivel mounted on the seat frame and having a cross bar 190 by an actuating handle provided for this purpose (and not shown in FIGS. 6 and 6a) and swiveling it counter-clockwise whereby the actuating element 120b is moved down against the pretension of the spring assembly 120a. On the other hand the fixing device 120 can also be released by folding the seat back forwards whereby the seat back is coupled to the actuating lever 109 through a Bowden cable which has a cable 121b and whose Bowden cable (not shown) is supported on a Bowden support 121. Furthermore a gearing part 122 which has a guide 122a and a mounting 122b for the cable 121b of the Bowden cable is mounted on the swivel axis of the actuating lever 109 by means of an axle shaft 124. This gearing part 122 converts tightening of the cable 121b which happens when the backrest is folded forwards into a swivel movement which in turn is transferred by two arms 123 of the gearing which engage round the actuating lever 109 to said lever. The actuating lever 109 thereby swivels clockwise when the backrest is folded forwards and releases the fixing device 120 through the actuating element 120b.

Furthermore a cable nipple 168 is fixed, for example squashed on the cable 121b of the Bowden cable between the Bowden cable support 121, which is fixed on the seat rail by means of a fixing plate 121a, and the gearing 122. The cable nipple 168 is associated with a switch element in the form of a switch lever 106 which is mounted by means of a bearing bushing 165, a stepped bolt 165a and a screw 166 for swivel movement about an axis formed through the longitudinal axis of the stepped bolt 165a, and at the same time is fixed on the seat frame or its seat rail 102. The switch lever 106 has in its upper section 161 a stop 162 which is mounted directly adjacent the cable nipple 168 and on which the cable nipple 168 can act in the seat longitudinal direction whereby the switch lever 106 is swiveled.

The second end section of the switch lever 106 mounted underneath the bearing bush 165 and the stepped bolt 165a forms an actuating section 160 which is associated with an actuating section of a locking pawl 104 of the memory device. The actuating section of the locking pawl 104 is thereby formed by an actuating face 140 on the top side of the locking pawl.

The switch lever 106 is here locked by a projection 191 of the actuating lever 109 on which the upper section 161 of the switch lever 106 is vertically supported with a stop 163 (transversely to the longitudinal direction L of the seat), in the position illustrated in FIGS. 6 and 6a in which its actuating section 160 acts on the actuating face 140 of the locking pawl 104. The torque required for this is applied through the spring assembly 120a of the fixing device 120 which acts through the actuating element 120b and actuating lever 109 on the lever projection 191.

As an alternative or in addition, the perpendicular position of the switch lever 106 can also be assisted through a spring mounted directly on the switch lever 106 (not shown) or by the switch lever 106 being mounted with sufficient friction which cannot be overcome through the action of the compression spring 400 of the locking pawl 104.

The locking pawl 104 itself is as can be seen in particular from FIG. 6a swivel mounted on a bearing stud 155 of a slider 105 which is guided with a base body 150 movable in the seat longitudinal direction L next to the ratchet openings 170 of the ratchet rail 107. The slider has in its base body 150 a recess 152 in which a compression spring 400 is mounted which is underneath the actuating face 140 of the locking pawl 104 and acts on the latter whereby the locking pawl 104 is pretensioned so that a ratchet hook 141 mounted at the other end of the locking pawl 104 has the tendency to engage in the ratchet rail 107. In the situation illustrated in FIGS. 6 and 6a in which the seat is locked in the memory position with the backrest not folded forwards the locking pawl is prevented from this tendency to engage, in that the actuating section 160 of the switch lever 106 is supported on the actuating face 140 of the locking pawl 104 so that the latter cannot pivot about the bearing stud 155 in order to bring the ratchet hook 141 into engagement with the ratchet rail 107.

In the situation illustrated in FIGS. 6 and 6a, a counter stop 144 of the locking pawl 104 is furthermore in contact with the stop 132 of a stop element 103 which is fixed by fixing screws 136 on the seat rail 102. Furthermore, a follower 143 of the locking pawl 104 which at the top adjoins the stop 144 is located in engagement with an engagement area 134 of the stop element 103.

If, in the position of the seat illustrated in FIGS. 6 and 6a in which the seat is locked in the memory position, the backrest is folded forwards then the cable 121b of the Bowden cable is tensioned and moved towards the rear (backrest side) seat end.

Figure 7:
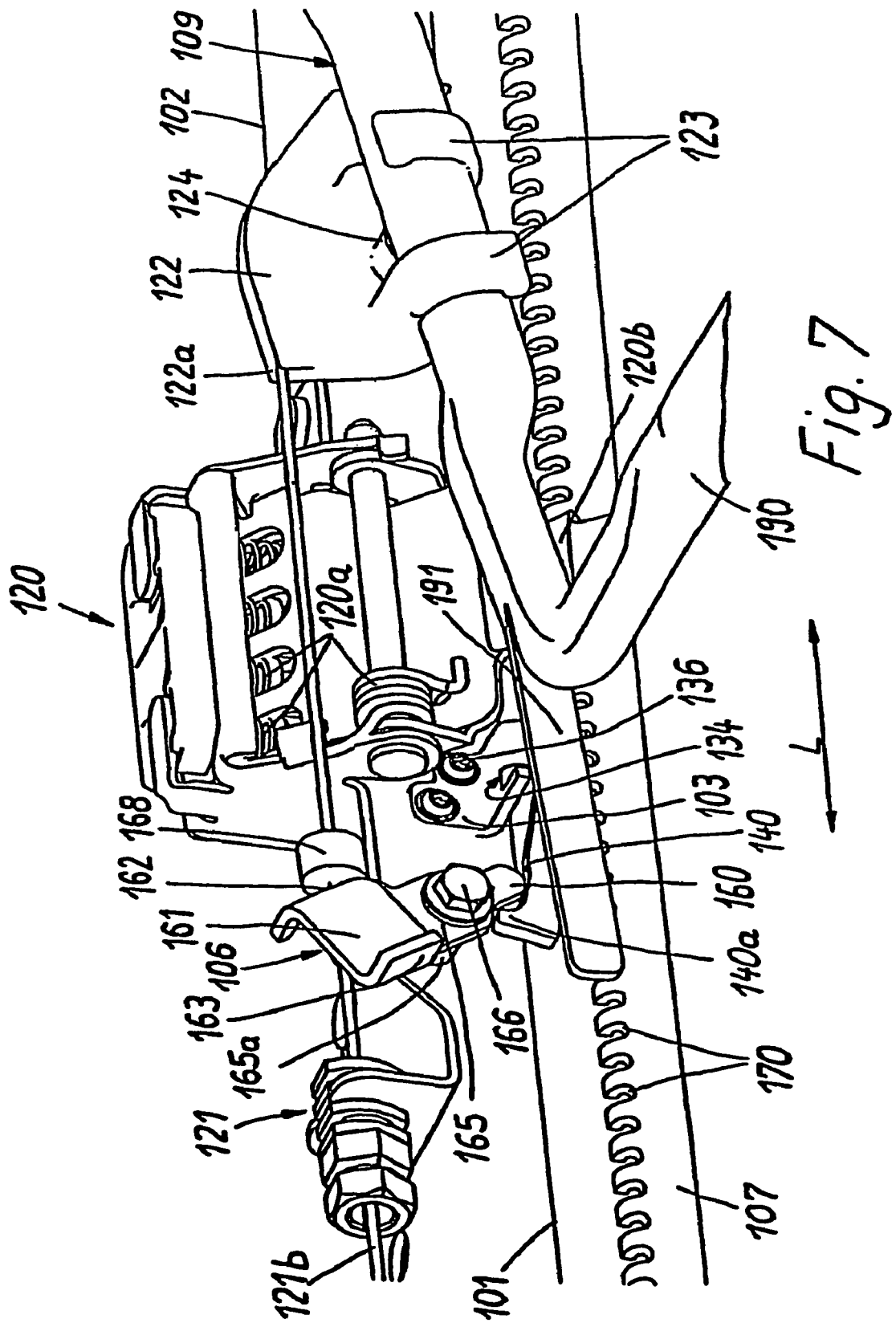
FIG. 7 is a perspective view according to FIG. 6 in a situation in which the backrest has been folded forwards so that the seat can be moved with the backrest folded forwards.

According to FIG. 7, on the one hand, the actuating lever 109 is hereby swiveled counter-clockwise through the gearing part 122 and arms 123 whereby it acts on the actuating element 120b and releases the fixing device 120. On the other hand the cable nipple 168 which is squashed with the cable 121b is moved towards the rear seat end and thereby acts on the stop 162 in the upper section 161 of the switch lever 106. The switch lever 106 is thereby pivoted counter-clockwise whereby its actuating section 160 is lifted from the associated actuating face 140 of the locking pawl 104. This swivel movement of the switch lever 106 is possible since the latter is no longer blocked by the lever projection 191 which was swiveled down together with the actuating lever 109. Since the switch lever 106 has released the locking pawl 104 the latter now swivels as a result of the action of the compression spring 400 (see FIG. 6a) about the bearing stud 155 of the slider 105 until the ratchet hook 141 engages in an opening 170 of the ratchet rail 107. The locking pawl 104 and thus the memory device as a whole is thereby locked.

The swivel movement of the locking pawl 104 furthermore has the result that the follower 143 of the locking pawl 104 as well as the engagement area 134 of the stop element 103 move out of engagement. This is necessary so that the seat frame can move since otherwise movement of the seat would be blocked by the locked memory device.

The cable nipple 168 thereby serves as the locking means which when the backrest is folded forwards acts on the switch lever 106 so that the locking pawl 104 cannot be released by means of the switch lever 106.

The arrangement is designed so that when folding the backrest forwards the ratchet hook 141 can engage already under the action of the compression spring 400 into a ratchet opening 170 before the fixing device 120 is released so far that the seat rail 102 can be displaced relative to the rail 101 fixed on the body. A permissible storage of the actual seat longitudinal position as the memory position is hereby guaranteed. If, however the ratchet hook 141 cannot immediately engage in a ratchet opening 170 because the seat is positioned so that the ratchet hook 141 under the action of the compression spring 400 stops on a web between two ratchet openings 170, then the ratchet hook 141 only engages in the next ratchet opening 170 which it passes after a slight displacement of the seat frame in the seat longitudinal direction L. In such a case there is a slight deviation between the seat longitudinal position when folding the backrest forwards, and the subsequently stored memory position.

In the situation shown in FIG. 7 which was reached by folding the backrest forwards, the seat frame can now be pushed forwards in the seat longitudinal direction with the backrest folded forwards in order to make it easier for a passenger to climb into the back of the vehicle or to place an object in the back of the vehicle.

If the seat is then moved back again with the backrest still folded forward it is then automatically stopped at the latest in the memory position defined by the locking pawl 104. For on reaching the memory position the stop 132 of the seat frame moves into contact with the stop 144 of the memory device whereby further movement of the seat frame backwards is prevented.

If then the backrest is again folded back into its function position then the tension of the cable 121b is released and the switch lever 106 and the actuating lever 109 with the projection 191 fixed thereon return to the position illustrated in FIGS. 6 and 6a. If then the actuating lever 109 is swiveled counter-clockwise to release the fixing device 120 the position shown in FIG. 8 is automatically set.

When manually swiveling the actuating lever 109 by means of an actuating handle provided for this purpose the fixing device 120 is indeed released through the actuating element 120b so that the seat frame can be moved in the seat longitudinal direction L on the rail 101 fixed on the body; however—unlike when folding the backrest forwards the switch lever 106 hereby remains in its upright position in which its actuating section 160 acts vertically on the actuating face 140. This prevents the locking pawl 104 from being locked under the action of the compression spring 400.

Figure 8:
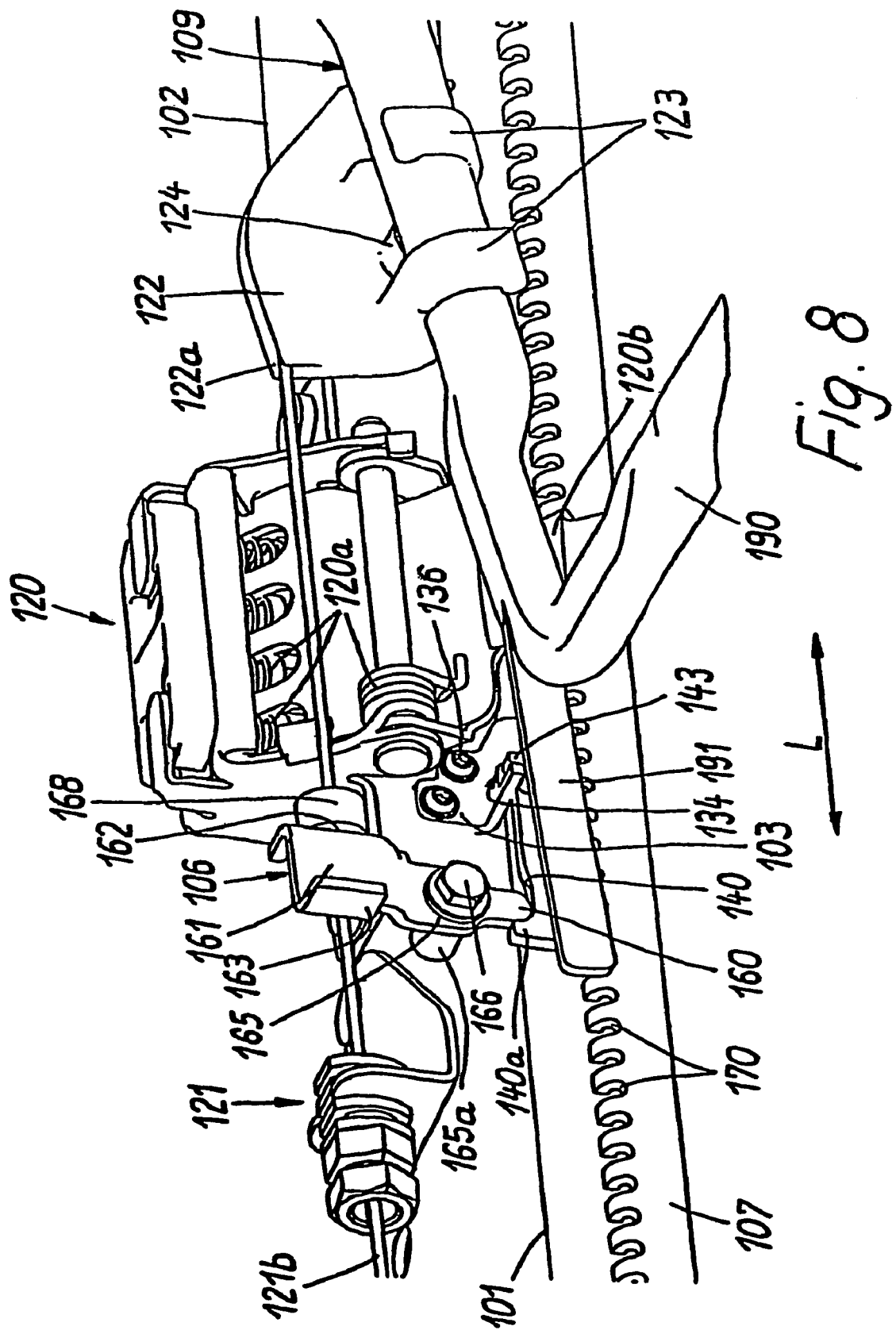
FIG. 8 is a perspective view according to FIG. 6 in a situation in which with the backrest raised up in the memory position an actuating lever was actuated in order to set the memory position anew.

As a result of the lever projection 191 which is swiveled down according to FIG. 8 and which consequently does not bear against the associated stop 163 of the switch lever 106 the vertical position of the switch lever 106 must be secured for example by a suitable design of the actuating face 140 of the locking pawl 104. The actuating face 140 can hereby be curved so that it under the action of the compression spring 400 of the locking pawl 104 exerts no moment on the actuating section 160 of the switch lever 106 which would result in a swivel movement of the switch lever 106 counter-clockwise. Expressed in other terms, the interaction of the actuating face 140 of the locking pawl 104 with the actuating section 160 of the switch lever 106 must be designed so that no counter-clockwise swivel movement of the switch lever 106 is triggered through the forces introduced by means of the compression spring 400 from the locking pawl 104. A swivel movement of the switch lever 106 clockwise is, however, blocked by the cable nipple 168.

Alternatively the upright position of the switch lever 106—as already mentioned above—can also be secured by a suitable spring element (not shown) or by sufficiently adequate friction forces.

In short, the actuation of the actuating lever 109 in the memory position of the seat (with the backrest not folded forwards) leads on the one hand to the fixing device 120 being released whilst at the same time the locking pawl 104 and thus the memory device overall remains in the released state which already existed prior to swiveling the actuating lever 109, see FIGS. 6 and 6a. Furthermore the follower 143 of the memory device engages in the engagement area 134 of the stop element 103 on the seat rail side.

In this situation any movement of the seat frame in the seat longitudinal direction L leads to the locking pawl 140 being entrained at the same time so that when sliding the seat a new memory position is set also at the same time. The newly set memory position which corresponds to the seat longitudinal position newly set by sliding the seat frame is however not already locked when the actuating lever 109 is finally let go. For this initially only has the result according to FIGS. 6 and 6a that the fixing device 120 is locked and thus the seat rail 102 is locked relative to the rail 101 fixed on the body. Locking of the memory device however according to FIG. 7 only takes place when in the new seat longitudinal position the seat back is folded forwards. Thus, with the present embodiment, the memory device is only always then locked when the seat is moved forwards with the backrest folded forwards within the scope of the easy-entry function.

Figure 9:
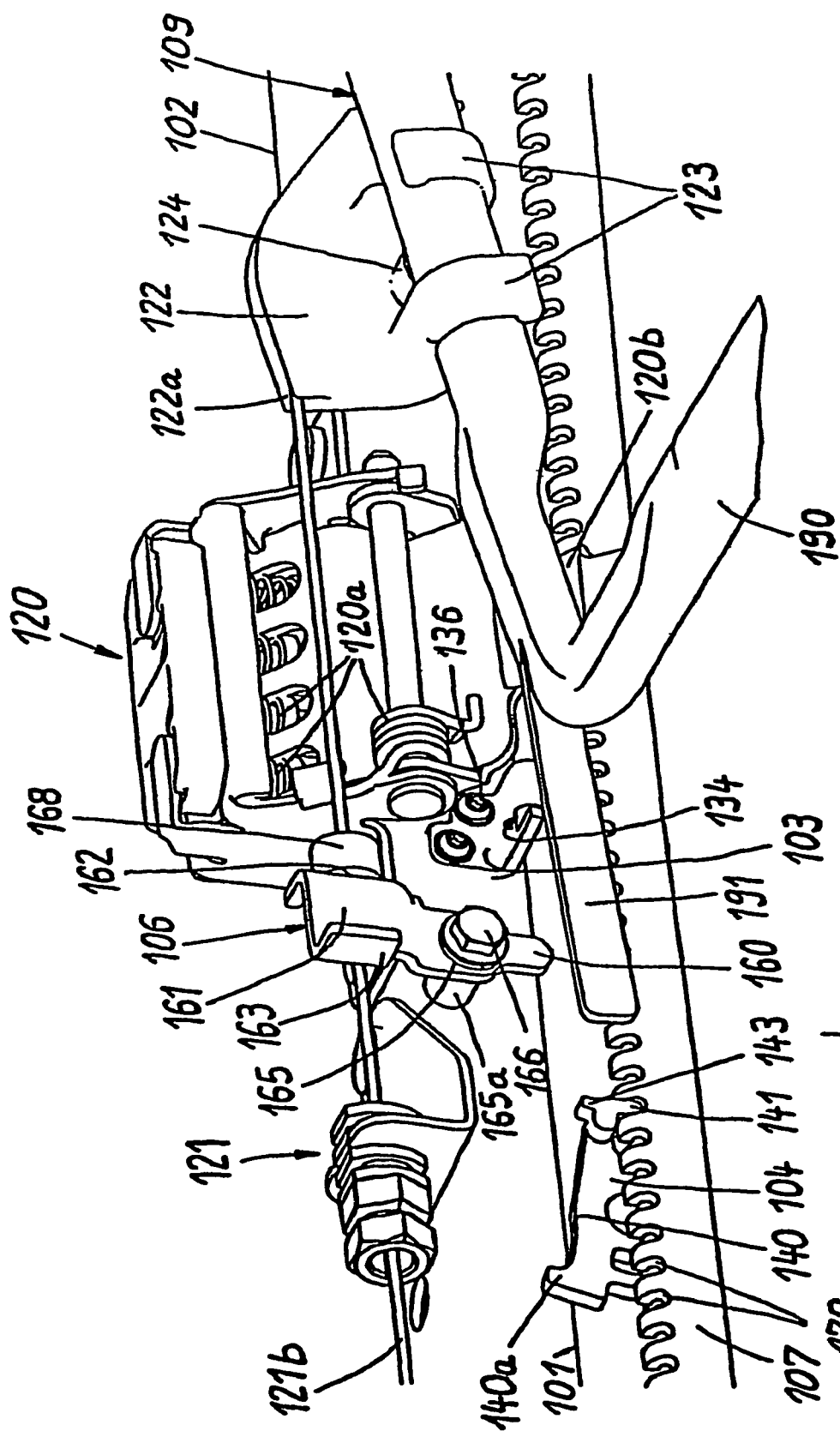
FIG. 9 is a perspective view according to FIG. 6 in a situation in which the memory position of the seat with the backrest raised up is approached.

FIG. 9 shows the seat frame after it was initially pushed forwards in the seat longitudinal direction L with the backrest folded forwards whereby the locking pawl 104 has been left back locked in the original seat position, and after then the backrest was folded back up into its function position. Furthermore the actuating lever 109 is swiveled so that the fixing device 120 is unlocked and the seat frame can be displaced selectively forwards or backwards in the seat longitudinal direction. In each seat longitudinal position which is hereby reached the seat frame can be locked relative to the rail 101 fixed on the body by means of the fixing device 120 by letting go the actuating lever 109.

Figure 10:
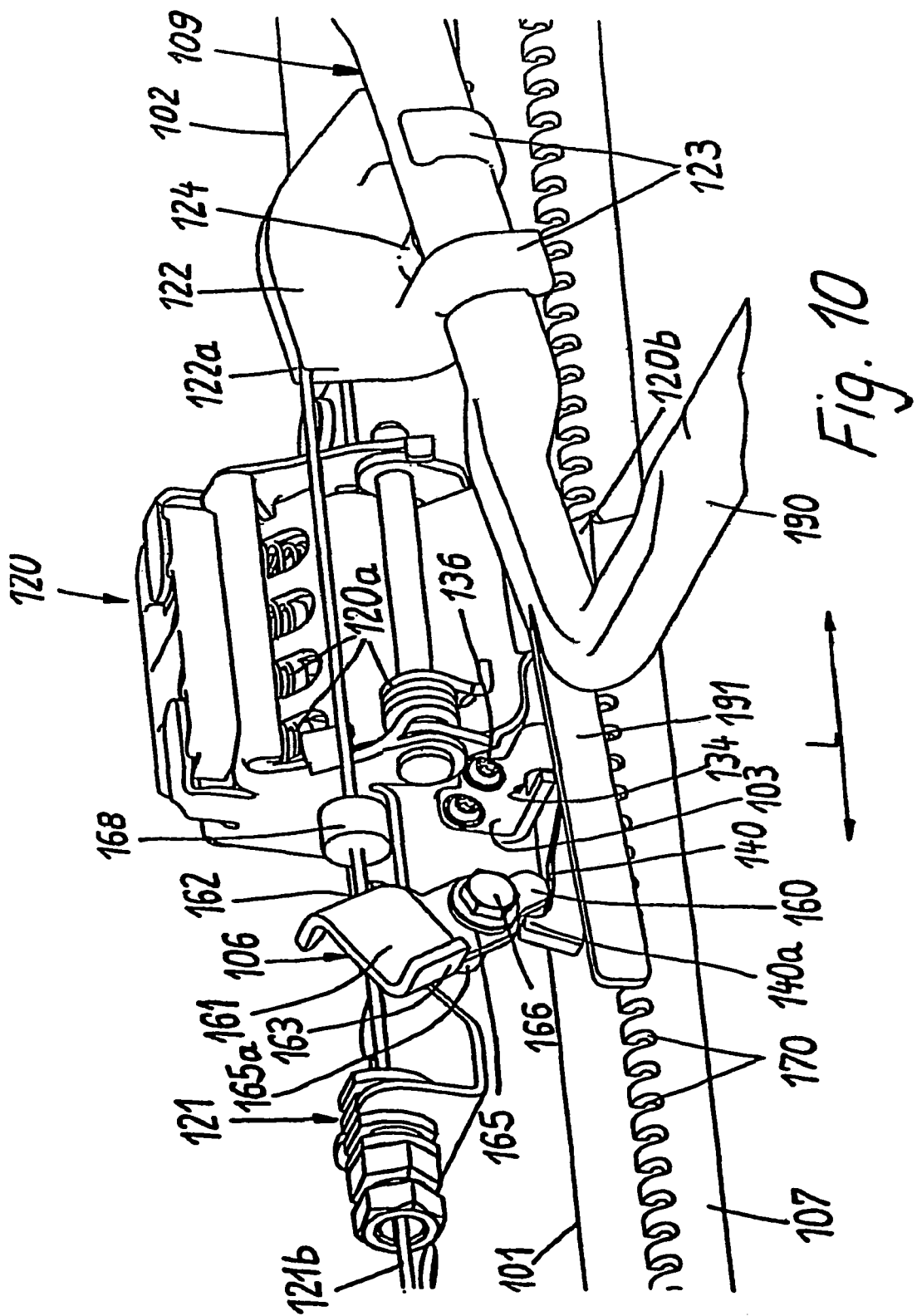
FIG. 10 is a perspective view according to FIG. 6 in a situation in which the memory position of the seat with the raised up backrest is reached.

FIG. 10 finally shows the position of the seat frame when the latter is moved back to the memory position with the backrest upright. The switch lever 106 thereby stops with its actuating section 160 against a projection 140a which protrudes vertically up from the actuating face 140 of the locking pawl 104. This is due to the fact that the locking pawl 104 is located in the locked state in which it engages by its ratchet hook 141 (see FIG. 6a) in a ratchet opening 170 of the ratchet rail 107. Through the inclined position of the actuating face 140 of the locking pawl 104 linked with this the latter exerts on the actuating section 160 of the switch lever 106 a torque with a component both parallel and perpendicular to the seat longitudinal direction L. As a result of this the switch lever 106 is swiveled counter-clockwise and its actuating section 160 moves to stop with the projection 140a of the locking pawl 104. This has the effect that the locking pawl 104 remains locked when the seat lower frame reaches the memory position illustrated in FIG. 10.

In short the actuating face 140 in the locked state of the locking pawl 104 interacts with the actuating section 160 of the switch lever 106 so that the latter is swiveled when the seat is pushed with the backrest upright into the memory position whereby release of the locking pawl 104 is prevented. (If the seat is pushed back into the memory position with the backrest folded forwards, then the switch lever 106 as a result of the action of the cable nipple 168 is readily swiveled, see FIG. 7, so that even in this case no release of the memory device can take place). On the other hand the actuating face 140 of the locking pawl 104 and the actuating section 160 of the switch lever 106 interact in the released state of the locking pawl 104, see FIG. 6, so that the locking pawl 104 remains unlocked, as detailed above with reference to FIG. 6.

Owing to the locked state of the locking pawl 104 the seat frame on reaching the memory position is automatically stopped when the stop 132 of the stop element 103 on the seat frame side becomes blocked with the counter stop 144 of the memory device (see FIG. 6a).

If then in the memory position the actuating lever 109 is let go then this is swiveled clockwise under the action of the spring assembly 120a of the fixing device 120 until the fixing device 120 is again locked. At the same time through the projection 191 of the actuating lever 109 which acts on the angled stop 163 in the upper section 161 of the switch lever 106 the switch lever 106 is swiveled clockwise into its upright position whereby the switch lever 106 acts by its actuating section 160 on the actuating face 140 of the locking pawl 104 and releases this (against the action of the compression spring 400)—which requires a corresponding design of the spring assembly 120a. The seat is then located again in the position explained with reference to FIGS. 6 and 6a with the backrest raised up in the memory position.

Different embodiments will now be explained with reference to FIGS. 1a to 4d showing how according to the present invention folding the backrest forwards onto the seat face of the seat frame is transferred through the coupling mechanism which then releases the fixing device of the longitudinal guide.

The following comments on FIGS. 1a to 4d are substantially restricted to the construction and function of the coupling mechanism 1. Further details will not be provided on the remaining structural groups of the seat assembly, such as e.g. the rail longitudinal guide, the fixing device of the rail longitudinal guide, the memory device as well as the interaction of these groups. For this reference is made to the above details relating to FIGS. 6 to 10.

FIG. 1a shows diagrammatically the seat frame G illustrated in FIG. 11 now in a position where the backrest R is set vertical. This corresponds as a rule to the front most position of use of the backrest, i.e. the front most position of the area of use in which the incline of the backrest R is adjustable in order to be able to adapt to the different needs of a person seated on a corresponding seat.

Figure 1B:
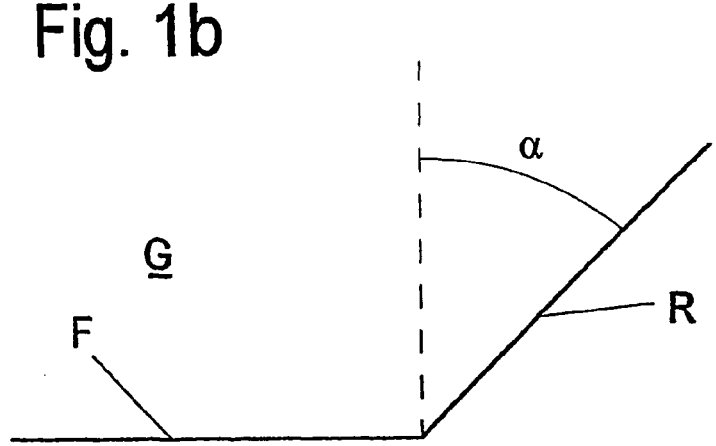

FIG. 1b shows the seat frame of FIG. 1a in a position in which the backrest R has been moved from the vertical position about an angle α into an incline position in which the backrest R is inclined sharply backwards.

With the coupling according to the invention it is possible—as will be explained below with reference to FIGS. 2a and 2b—to reach the situation where when folding the backrest forwards for the purpose of triggering the easy-entry function both from the position illustrated in FIG. 1a (substantially upright backrest R) and also from the position illustrated in FIG. 1b (sharply backwards inclined backrest R) the release of the fixing device takes place for the seat longitudinal guide with the same incline of the backrest R forwards; in the example here the rake angle is about 20° relative to the vertical. This means that the release of the fixing device by folding the backrest forwards takes place each time when the backrest is a defined angle β away from the swivel position in which it rests on the seat face F of the seat frame.

FIG. 2a shows diagrammatically a Bowden cable 10 which is a constituent part of the coupling mechanism 1 for coupling the backrest to the fixing device of the seat longitudinal guide. The Bowden cable 10 comprises a Bowden sleeve 11 and core 15. The Bowden sleeve 11 is fixable by its backrest end 12 by means of a Bowden cable block to a side part of the seat frame. The other end 13 of the Bowden sleeve 11 facing the fixing device which is to be released is fixed on a Bowden cable block of the seat-side rail (top rail) of the seat longitudinal guide.

The core 15 of the Bowden cable extends from a tumbler fitment T of the seat back R (see FIG. 11) up to an actuating lever H—shown symbolically in FIG. 2a—for releasing the fixing device of the seat longitudinal guide. Correspondingly the core 15 of the Bowden cable 10 is fixed by its end 16 associated with the seat back and representing the input side of the coupling mechanism, on the tumbler fitment T of the seat back R (see FIG. 11) and by its other end 17 which is provided on the output side of the coupling mechanism to the actuating lever H. K in FIG. 2a designates a curve along which the backrest-side end 16 of the core 15 of the Bowden cable 10 moves when adjusting the rake of the backrest. This curve K thus represents the tumbler movement of the tumbler fitment and the movement hereby triggered of the backrest-side end 16 of the core 15 of the Bowden cable 10.

It can be seen that the backrest side end 16 of the core 15 in the situation of the coupling mechanism 1 represented in FIG. 2a (corresponding to a vertically set backrest R according to FIG. 1a) has the greatest possible distance from the actuating lever H which can happen when this end 16 of the core 15 moves along the curve K.

Figure 2B:
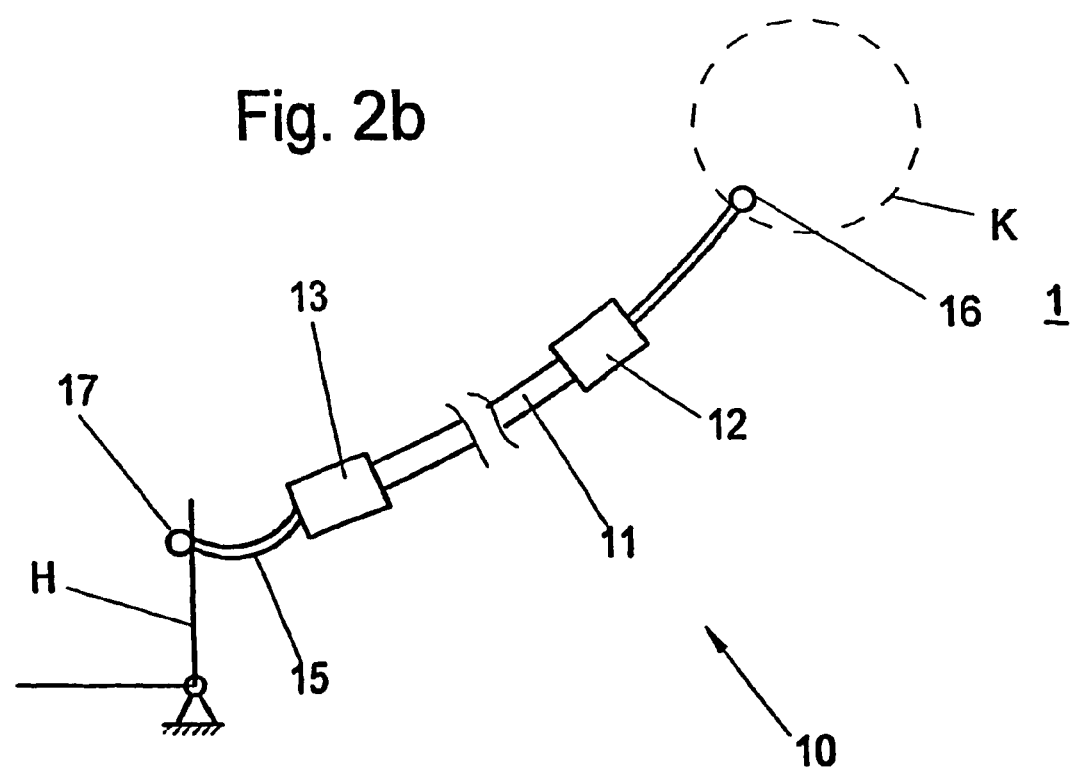

FIG. 2b shows on the other hand the coupling mechanism 1 in the situation where the backrest R has been set into a sharply rearwardly inclined position. In this position the backrest-side end 16 of the core 15 of the Bowden cable 10 has the smallest possible spacing from the actuating lever H.

According to the invention the core 15 of the Bowden cable 10 has in the position of the coupling mechanism 1 shown in FIG. 2b a slack which is dimensioned so that the core 15 during swivel movement of the backrest R from the swivel position inclined sharply back shown in FIG. 2b into the vertical position shown in FIG. 1a is just lifted, thus the cable begins to tighten on reaching the vertical position. The release of the fixing device of the seat longitudinal guide by means of the coupling mechanism 1, more particularly the Bowden cable 10 starts by the core 15 acting with increasing tightening through the actuating lever H on the fixing device until this is released. The release is terminated when the backrest R has been folded forwards about 20° relative to the vertical. The seat can then be moved forwards to execute the easy-entry function in order to make it easier for a person to enter the back of the vehicle.

Means are thereby provided for guiding the Bowden cable 10, more particularly the core 15 which ensure that when the backrest R is folded forwards beyond the position shown in FIG. 1a the core is guided so that it actually results in further tightening of the core 15.

The coupling mechanism illustrated in FIGS. 2a and 2b has the advantage that a compensation of the tumbler movement is carried out through a simple slack in the core of the Bowden cable. This has the positive side effect that wear on the Bowden cable is minimised since the Bowden cable is tightened only in a single useful position (namely the foremost useful position, for example vertical position); the wear involved with permanent tightening of the core is hereby avoided.

In order to prevent chattering noises of the coupling mechanism during operation of the vehicle as a result of slack in the core of the Bowden cable a small weakly dimensioned spring is sufficient either to engage directly on the core 15 of the Bowden cable 10 (not shown) or to act on another part of the coupling mechanism such as e.g. the actuating lever H.

Figure 3:
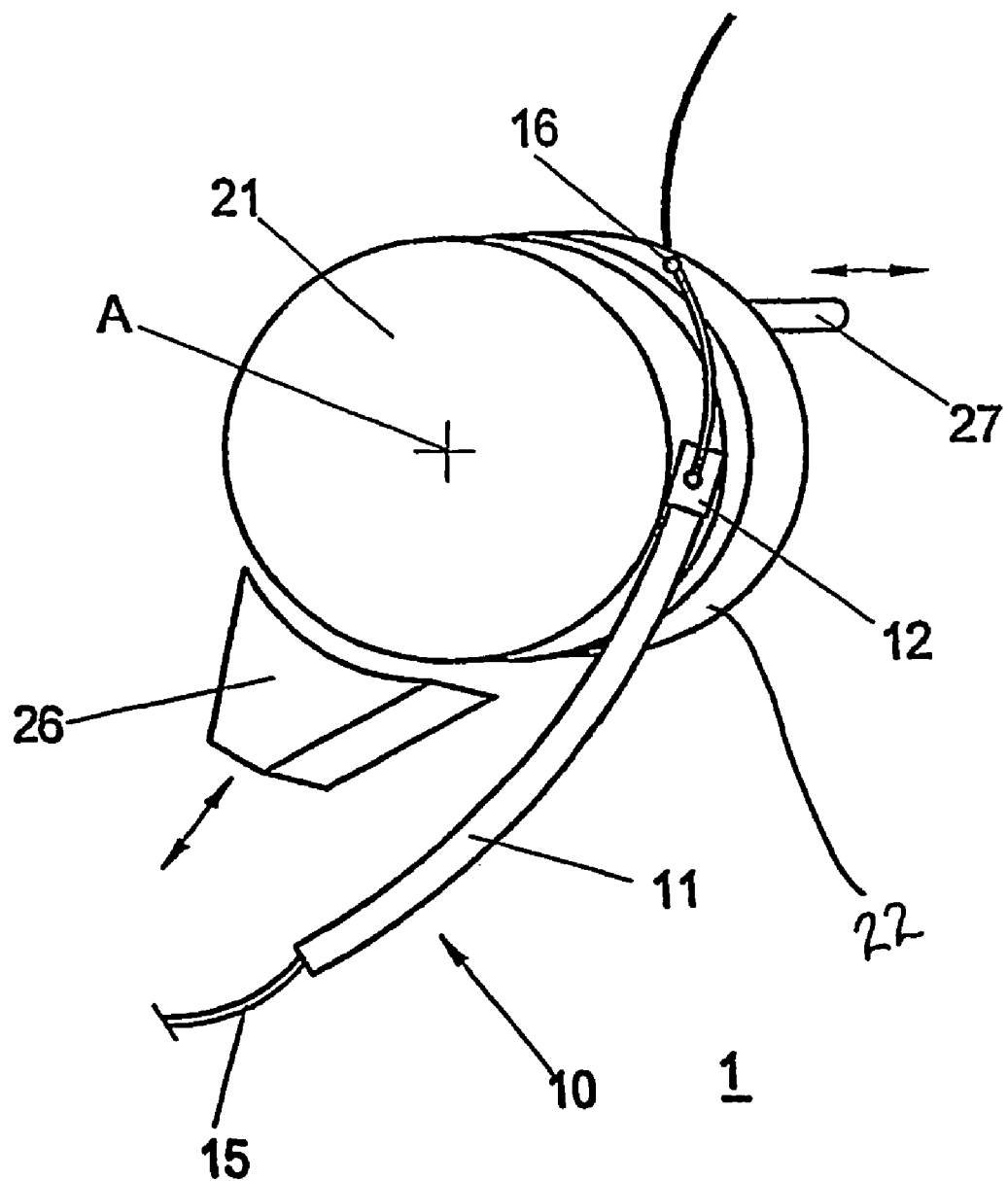
FIG. 3 is a perspective view of two retaining discs which are rotatable relative to each other of which one disc serves to hold the end of the Bowden cable sleeve on the backrest side and the other disc serves to hold the end of the Bowden cable core on the backrest side, forming a component of the coupling mechanism for coupling a seat back to the fixing device of a seat longitudinal guide.

With the embodiment illustrated in FIG. 3 the end 12 of the Bowden sleeve 11 on the backrest side as well as the end 16 of the core 15 of the Bowden cable 10 on the backrest side are each fixed on one of two relatively rotatable retaining discs (or holders) 21, 22 which are mounted for example loosely on the tumbler axis A of the backrest fitment (tumbler fitment). As a result of the loose bearing of the two retaining discs 21, 22 on a common axis, any adjustment of the backrest rake or folding the backrest forwards for the purpose of triggering the easy-entry function initially has no effect on the tightening of the core 15 of the Bowden cable 10 so that no release of the fixing device can take place through the Bowden cable or through the tightening of the core of the Bowden cable 10.

If however on folding the backrest forwards for the purpose of triggering the easy-entry function the foremost useful position of the backrest or the foremost position of the area of use of the backrest R is exceeded (see FIG. 1a) then, on the one hand, a locking element in the form of a locking pin 27 moves from the tumbler fitment into the retaining disc 22 which holds the one end 16 of the cable 15. This is entrained further by the tumbler fitment which in turn results in entrainment of the backrest side end 16 of the core 15 of the Bowden cable 10 fixed on the retaining disc 22.

At the same time the other retaining disc 21 on which the backrest end 12 of the Bowden sleeve 11 is fixed is blocked by means of a blocking element 26 which is mounted for example on a seat side part. This retaining disc 21 can therefore execute no further movement. As a result therefore during further swivel movement of the backrest there is a relative movement between the backrest side end 16 of the core 15 and the backrest end 12 of the sleeve 11 of the Bowden cable 10. The core is hereby increasingly tightened and triggers the release of the fixing device of the seat longitudinal guide.

As a result therefore even with this embodiment it is reached that the release of the fixing device when folding the backrest forwards—independently of the previously set useful position of the backrest—always starts with a defined position of the back rest and is thus reached with a defined folding angle of the backrest forwards.

FIGS. 4a to 4d show an embodiment of the coupling mechanism 1 in which the end 17 of the core 15 of the Bowden cable 10 associated with the fixing device of the seat longitudinal guide or the actuating lever provided for releasing this fixing device engages on an end 31 of a release lever 30 which is swivel mounted on the seat-side rail of the rail longitudinal guide (top rail 102). The other end 32 of this release lever 30 interacts with a further lever 35 on the output side which in turn can act with an actuating section 36 on the fixing device of the seat longitudinal guide in order to release same. This further lever 35 on the output side is also mounted for swivel movement on the seat-side rail (top rail 102) of the seat longitudinal guide. The release lever 30 is thereby pretensioned by a spring 34 against the active direction of the core 15 of the Bowden cable 10 when the core is tightened.

Figure 4A:
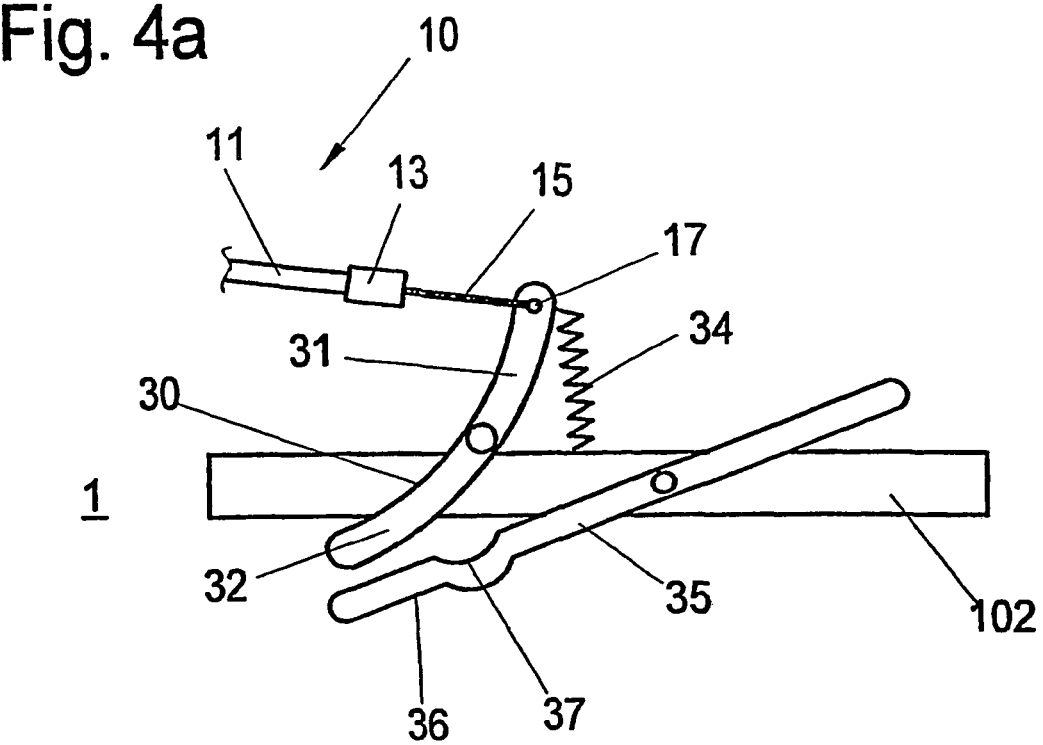
FIGS. 4a to 4d are side views of an exemplary lever assembly coupled through a Bowden cable to the seat back of a seat frame for releasing the fixing device of a seat longitudinal guide with four different settings of the backrest rake.

FIG. 4a shows this coupling mechanism 1 in a state in which the backrest R—for example according to FIG. 1b—is set inclined backwards. The lower end 32 of the release lever 30 is hereby out of engagement with the actuating section 36 of the further lever 35 on the output side. When the backrest is folded forwards for the purpose of triggering the easy-entry function, forces introduced into the Bowden cable 10 therefore initially do not result in release of the fixing device of the seat longitudinal guide.

Figure 4B:
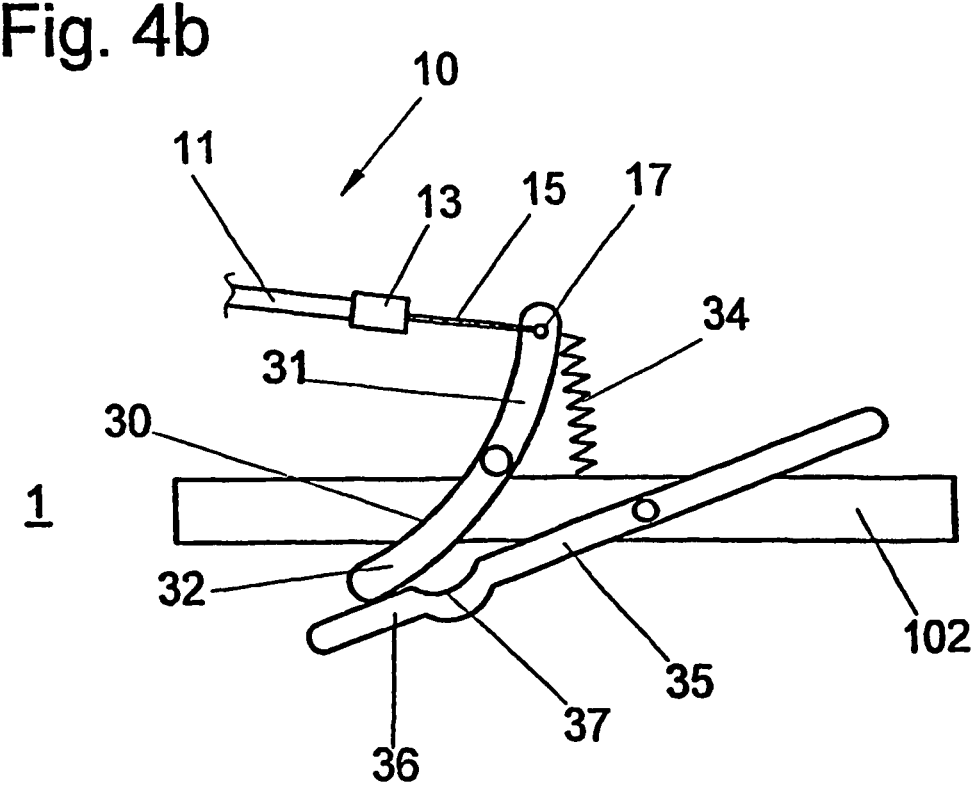

On folding the backrest further forwards the release lever 30 moves into contact by its lower end 32 with the actuating section 36 of the further lever 35 on the output side as soon as the backrest R is located in its front useful position (see FIG. 1a). At this moment the release lever 30 starts to act on and thus release the fixing device through the further lever 35 mounted on the output side. This situation is shown in FIG. 4b.

Figure 4C:
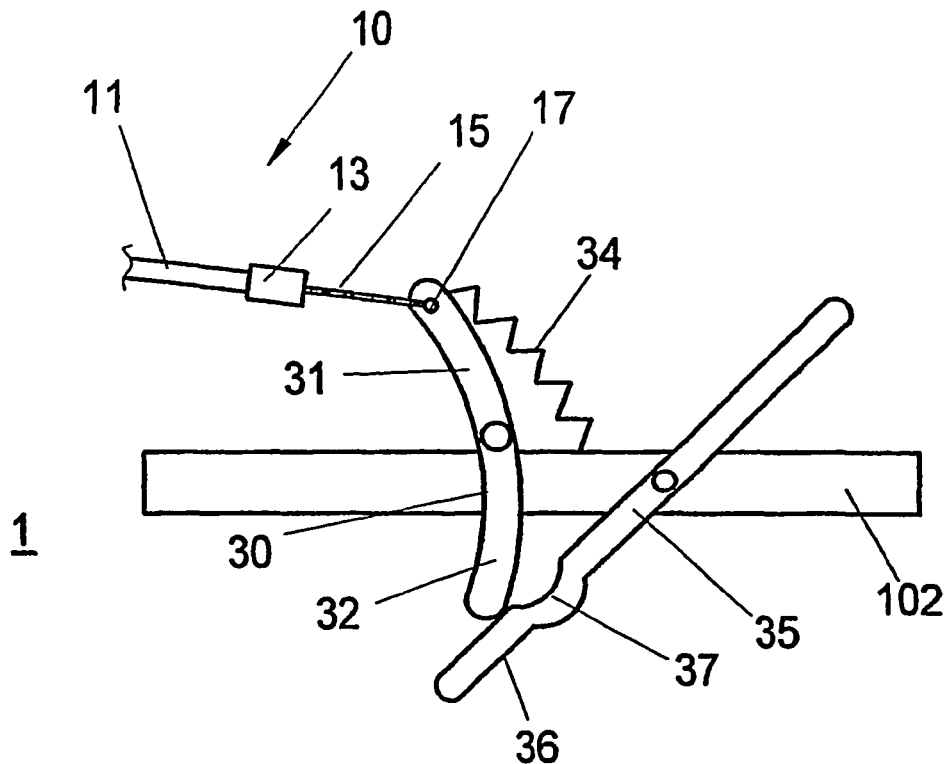
Figure 4D:
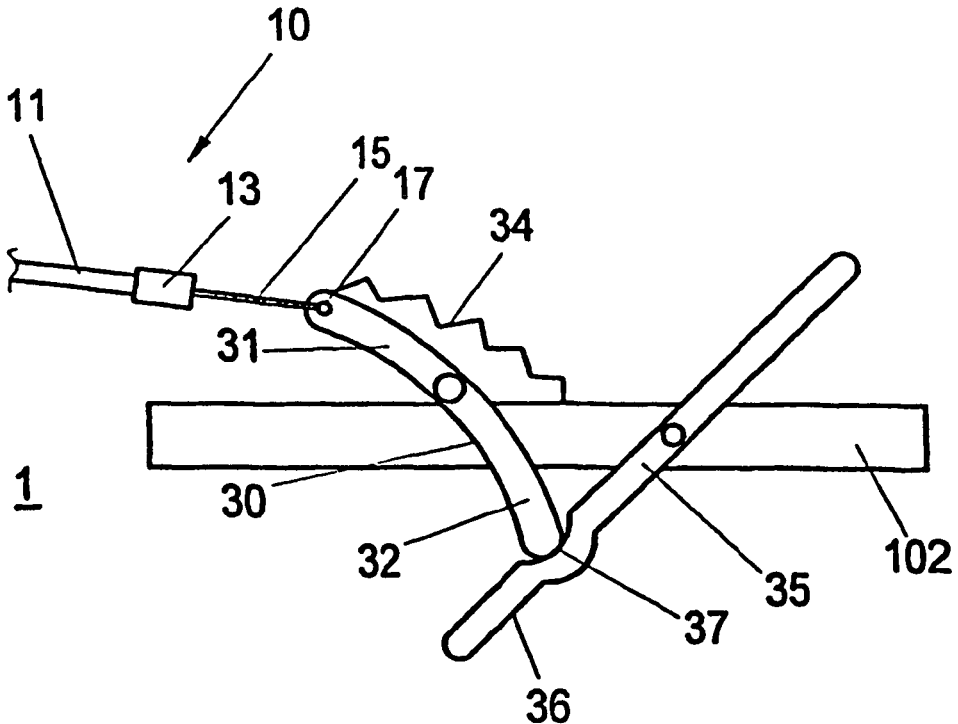

The release of the fixing device is concluded when the lever 35 on the output side has been swiveled sufficiently far through the release lever 30, as shown in FIG. 4c.

With any possible further folding forwards of the backrest R the release lever 30 then engages by its lower end 32 into a bulge 37 of the actuating section 36 of the lever 35 on the output side. The rounded area of this bulge 37 is selected so that the lower end 32 of the release lever 30 when swiveling the release lever 30 can move therein without triggering any further movement of the lever 35 on the output side. The overtravel when folding the backrest beyond the point in which the fixing device is completely released can be compensated hereby, see FIG. 4d.

An overtravel compensation of this kind by means of two interacting levers 30, 35 can also be combined with the embodiment according to FIGS. 2a, 2b and FIG. 3 in that the actuating lever H provided there is replaced each time by the levers 30, 35. This arrangement for the overtravel compensation is even independent of whether according to the present invention compensating means are provided for compensating the tumbler movement before releasing the fixing device. The overtravel compensation by means of the levers 30, 35 thus represents an independent inventive idea.

Figure 5B:
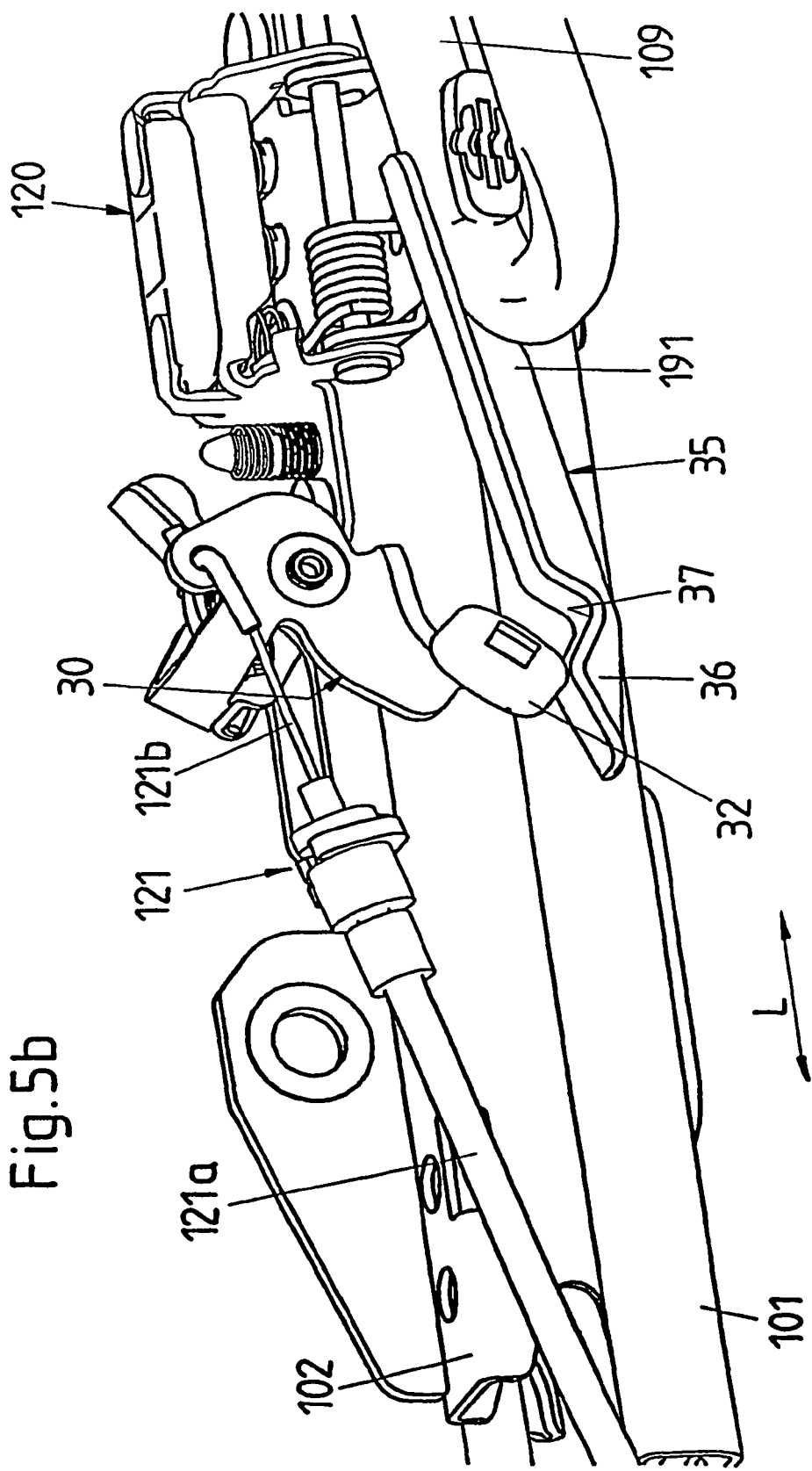

According to FIG. 5a the embodiment of a coupling mechanism shown in FIG. 4a is integrated into a rail assembly with easy-entry mechanism, as shown in FIGS. 6 to 10. This arrangement comprises in particular a rail 101 fixed on the body (lower rail) and a seat rail 102 (top rail) which is guided movable in the seat longitudinal direction L relative to the rail 101 fixed on the body and which can be locked by means of a fixing device 120 on the rail 101 fixed on the body. This fixing device 120 is coupled in the manner previously described with reference to FIGS. 6 to 10 to the backrest of a motor vehicle seat through a Bowden cable 121a, 121b with a Bowden support 121 and a cable 121b (as core) guided in the Bowden sleeve 121a in order to be able to release the fixing device 120 for triggering the easy-entry function when folding the backrest forwards.

The coupling mechanism which serves to couple the fixing device 120 to the backrest of the motor vehicle seat has in addition to the Bowden cable with the core 121b an actuating lever 109 with projection 191, as described with reference to FIGS. 6 to 10, and which here corresponding to the details on FIGS. 4a to 4d serves as a lever 35 provided on its actuating section 36 with a bulge 37. Connected in front of this lever 35 is a release lever 30 which is coupled to the core 121b of the Bowden cable corresponding to the release lever 30 of FIGS. 4a to 4d so that when the backrest of the vehicle seat is folded forwards it can be swiveled to release the fixing device 120. This release lever 30 corresponds to the gearing part 122 of FIGS. 6 to 10, but with the important difference that the release lever 30 engages not directly on the actuating lever 109 but rather acts by one end 32 on the actuating section 36 of the projection 191 which is provided on the actuating lever 109.

FIG. 5a shows the coupling mechanism for coupling the backrest to the fixing device 120—corresponding to the illustration in FIG. 4b—in a situation where the backrest R—for example according to FIG. 1a—runs substantially perpendicular, thus is located in its front position of use.

If the backrest is folded forward from this position then the cable 121b of the Bowden cable is tightened and the release lever 30 swivels counter-clockwise whereby it bears with its one end 32 on the actuating section 36 of the lever 35 on the output side, so that the latter, more particularly its actuating lever 109, is swiveled to release the fixing device 120.

The release of the fixing device is concluded when the lever 35 on the output side and thus the actuating lever 109 as a component part of the lever 35 on the output side has been swiveled so far that the locking teeth (not shown) of the fixing device 120 have completely lifted out from the associated ratchet device which is fixed on the body.

With any possible further folding forward of the backrest the release lever 30 then engages by its lower end 32 in the bulge 37 of the actuating section 36 of the lever 35 on the output side. This bulge is designed so that the lower end 32 of the actuating lever 30 can move therein without releasing any further movement of the lever 35 on the output side. The overtravel when folding the backrest forwards beyond the point at which the fixing device 120 be completely released, can hereby be compensated, see FIG. 5*c*. More particularly it is prevented that when the backrest is folded forwards beyond the point at which the fixing device 120 is completely released there is further additional action on the actuating element 120*b* (see FIG. 6) of the fixing device 120, i.e. it is prevented that the actuating element 120*b* after complete release of the fixing device 120 is deflected still further (additionally). Damage to the fixing device 120, for example by its resetting springs, through overstrain as a result of folding the backrest forwards is hereby prevented.

The invention claimed is:

1. A motor vehicle seat comprising:
    a seat frame;
    a swivel mounted backrest of the seat frame, which on one side is adjustable by swiveling in an area of use between different useful positions and on another side in a released state is foldable forwards by swiveling the backrest in a direction of the seat face of the seat frame;
    a seat longitudinal guide that sets the seat longitudinal position;
    a fixing device that locks a previously set seat longitudinal position;
    a coupling mechanism through which the backrest is coupled to the fixing device so that the fixing device is released when folding the backrest forwards, wherein the coupling mechanism comprises a traction device which on swiveling the backrest transfers forces to an output side of the coupling mechanism so that the coupling mechanism acts on the fixing device, and which traction device is fixed on a holder which holder is mounted to pivot about an axis of the backrest;
    a tumbler fitment of the backrest which during swiveling of the backrest tumbles about a tumbler axis and to which is coupled an input side of the coupling mechanism; and
    a compensating device provided so that when the backrest is swiveled at least over a portion of the area of use, prevents release of the fixing device, and wherein the holder is not entrained by the tumbler fitment when the backrest is pivoted within the portion of the area of use.

2. The motor vehicle seat according to claim 1, wherein the compensating device is formed for compensating the action of the backrest on the coupling mechanism when swiveling the backrest in the portion of the area of use.

3. The motor vehicle seat according to claim 1, wherein the compensating device is formed and provided to prevent during swivel movement of the backrest in the portion of the area of use such action of the coupling mechanism on the fixing device which would lead to release of the fixing device.

4. The motor vehicle seat according to claim 1, wherein the compensating device is formed and provided to prevent, during swivel movement of the backrest in the portion of the area of use, action of the traction device of the coupling mechanism on the fixing device.

5. The motor vehicle seat according to claim 1, wherein the compensating device is formed and provided to only permit action of the coupling mechanism on the fixing device when the backrest has approached the fully folded forwards position except for a predeterminable angular difference.

6. The motor vehicle seat according to claim 1, wherein the compensating device is arranged as one of in and on the coupling mechanism.

7. The motor vehicle seat according to claim 2 or 6, wherein the compensating device during swivel movement of the backrest in the portion of the area of use compensates action of the backrest on the coupling mechanism, so that on the output side of the coupling mechanism, no action takes place on the fixing device.

8. The motor vehicle seat according to claim 1, wherein the coupling mechanism comprises a Bowden cable with a Bowden sleeve and Bowden core and the traction device comprises the core of the Bowden cable.

9. The motor vehicle seat according to claim 8, wherein the holder comprises two holders which are rotatable relative to each other and which are mounted to swivel about the tumbler axis and which when folding the backrest forwards are only turned relative to each other when the backrest is located outside of the portion of the area of use, wherein one end of the Bowden sleeve is attached to one holder and the Bowden cable extending from that end of the Bowden sleeve is attached to the other holder.

10. The motor vehicle seat according to claim 9, wherein when folding the backrest forwards outside of the portion of the area of use one holder is swiveled together with the tumbler fitment and the other holder is blocked on a structural assembly of the seat frame which cannot swivel together with the backrest.

11. A motor vehicle seat with a seat frame comprising:
    a swivel mounted backrest of the seat frame, which on one side is adjustable by swiveling in an area of use between different useful positions and on another side is foldable forwards in a released state by swiveling the backrest towards a seat face of the seat frame;
    a seat longitudinal guide that sets the seat longitudinal position;
    a fixing device that locks a previously set seat longitudinal position;
    a coupling mechanism through which the backrest is coupled to the fixing device so that the fixing device is released when folding the backrest forwards;
    a tumbler fitment of the backrest which when swiveling the backrest tumbles about a tumbler axis and to which an input side of the coupling mechanism is coupled; and
    a compensating device provided which when folding the backrest forwards beyond the position in which the release of the fixing device is terminated, prevents interaction of a lever and a release lever of the coupling mechanism so that an additional action on the fixing device is prevented.

12. The motor vehicle seat according to claim 11, wherein the compensating device comprises a bulge on one of the lever and release lever.

13. The motor vehicle seat according to claim 12, wherein the lever on the output side has a bulge in which an end section of the release lever on the input side can move without additionally acting on the lever on the output side.

14. The motor vehicle seat according to claim 13, wherein the contour of the bulge has at least in part such a curvature, more particularly such a radius, that the end section of the release lever on the input side, can move therein without additionally acting on the lever on the output side.

15. The motor vehicle seat according to claim 14, wherein the end section of the coupling lever moves into the bulge of the lever when the release of the fixing device is terminated.

16. The motor vehicle seat according to claim 1, wherein the compensating device is integrated in the fixing device.

17. The motor vehicle seat according to claim 1, wherein the holder is mounted to pivot relative to the backrest.

* * * * *